(12) United States Patent
Gupta

(10) Patent No.: US 10,275,596 B1
(45) Date of Patent: Apr. 30, 2019

(54) ACTIVATING MALICIOUS ACTIONS WITHIN ELECTRONIC DOCUMENTS

(71) Applicant: Symantec Corporation, Mountain View, CA (US)

(72) Inventor: Prashant Gupta, Gloucestershire (GB)

(73) Assignee: Symantec Corporation, Mountain View, CA (US)

( * ) Notice: Subject to any disclaimer, the term of this patent is extended or adjusted under 35 U.S.C. 154(b) by 92 days.

(21) Appl. No.: 15/379,709

(22) Filed: Dec. 15, 2016

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
CPC .................... G06F 21/566; G06F 2221/034
See application file for complete search history.

(56) References Cited

U.S. PATENT DOCUMENTS

| | | | | |
|---|---|---|---|---|
| 7,343,626 B1* | 3/2008 | Gallagher | ............. | G06F 21/577 707/999.003 |
| 8,752,183 B1* | 6/2014 | Heiderich | ............. | G06F 21/577 726/22 |
| 8,931,084 B1* | 1/2015 | Paya | ............. | H04L 67/02 380/280 |
| 8,997,226 B1* | 3/2015 | Call | ............. | G06F 21/552 726/22 |
| 9,027,142 B1* | 5/2015 | Call | ............. | G06F 21/54 726/25 |
| 9,049,222 B1* | 6/2015 | He | ............. | H04L 63/1416 |
| 9,106,690 B1* | 8/2015 | Banga | ............. | H04L 63/1433 |
| 9,112,900 B1* | 8/2015 | Peacock | ............. | G06F 17/2247 |
| 9,124,622 B1* | 9/2015 | Falkowitz | ............. | H04L 63/1416 |
| 9,128,743 B1* | 9/2015 | Bondalapati | ............. | G06F 9/45558 |
| 9,213,839 B2* | 12/2015 | Cao | ............. | G06F 21/563 |
| 9,215,245 B1* | 12/2015 | Rajab | ............. | H04L 63/1433 |
| 9,225,729 B1* | 12/2015 | Moen | ............. | G06F 21/577 |
| 9,231,975 B2* | 1/2016 | Johns | ............. | H04L 63/20 |
| 9,244,705 B1* | 1/2016 | Bondalapati | ............. | G06F 9/45504 |
| 9,250,940 B2* | 2/2016 | Mickens | ............. | G06F 21/53 |
| 9,325,734 B1* | 4/2016 | Peacock | ............. | G06F 17/2247 |
| 9,350,750 B1* | 5/2016 | Aval | ............. | H04L 63/1416 |
| 9,350,757 B1* | 5/2016 | Falkowitz | ............. | H04L 63/145 |
| 9,386,037 B1* | 7/2016 | Hunt | ............. | H04L 63/1483 |
| 9,413,774 B1* | 8/2016 | Liu | ............. | H04L 63/1416 |
| 9,438,613 B1* | 9/2016 | Paithane | ............. | H04L 63/1425 |
| 9,578,048 B1* | 2/2017 | Hunt | ............. | H04L 63/1483 |
| 9,680,865 B2* | 6/2017 | Montagnon | ............. | H04L 67/2814 |
| 9,686,283 B2* | 6/2017 | Hunt | ............. | H04L 63/1483 |
| 9,690,606 B1* | 6/2017 | Ha | ............. | G06F 21/566 |

(Continued)

*Primary Examiner* — David Garcia Cervetti
(74) *Attorney, Agent, or Firm* — Holland & Hart LLP

(57) ABSTRACT

A method and system for activating malicious actions within electronic documents is described. In one embodiment, the method may include receiving, by a processor of a computing device, the electronic document; identifying, by the processor, an object embedded within the electronic document; identifying, by the processor, an action associated with execution of the object; executing, by the processor, the action within a context of rules associated with the object; identifying, by the processor, at least one behavior that results from execution of the action; and determining, by the processor, an existence of at least one malicious element from the identified behavior.

20 Claims, 6 Drawing Sheets

(56) References Cited

U.S. PATENT DOCUMENTS

| | | | |
|---|---|---|---|
| 9,705,902 B1* | 7/2017 | Call | G06F 21/552 |
| 9,712,560 B2* | 7/2017 | Sivan | G06F 16/986 |
| 9,781,144 B1* | 10/2017 | Otvagin | H04L 63/1425 |
| 9,794,276 B2* | 10/2017 | Call | H04L 63/1425 |
| 9,807,113 B2* | 10/2017 | Yang | H04L 63/1483 |
| 9,825,984 B1* | 11/2017 | Hoover | H04L 63/145 |
| 9,923,919 B2* | 3/2018 | Call | H04L 63/1441 |
| 9,923,920 B1* | 3/2018 | Falkowitz | H04L 63/145 |
| 9,934,376 B1* | 4/2018 | Ismael | G06F 9/45558 |
| 9,973,519 B2* | 5/2018 | Call | H04L 63/1425 |
| 10,050,998 B1* | 8/2018 | Singh | H04L 63/1416 |
| 10,089,461 B1* | 10/2018 | Ha | G06F 21/56 |
| 2005/0132070 A1* | 6/2005 | Redlich | G06F 21/6209 709/228 |
| 2005/0138109 A1* | 6/2005 | Redlich | G06F 21/554 709/201 |
| 2005/0138110 A1* | 6/2005 | Redlich | C07K 14/70575 709/201 |
| 2007/0107057 A1* | 5/2007 | Chander | G06F 21/54 726/22 |
| 2008/0083012 A1* | 4/2008 | Yu | G06F 21/50 726/1 |
| 2008/0320498 A1* | 12/2008 | Maykov | G06F 16/951 719/320 |
| 2009/0150999 A1* | 6/2009 | Dewey | G06F 21/56 726/24 |
| 2009/0293102 A1* | 11/2009 | Klein | G06F 21/52 726/2 |
| 2010/0064369 A1* | 3/2010 | Stolfo | G06F 21/56 726/24 |
| 2011/0047542 A1* | 2/2011 | Dang | G06F 9/468 718/1 |
| 2011/0185271 A1* | 7/2011 | Aciicmez | G06F 21/563 715/234 |
| 2011/0307955 A1* | 12/2011 | Kaplan | H04L 63/0227 726/23 |
| 2013/0042306 A1* | 2/2013 | Hou | G06F 21/316 726/4 |
| 2013/0145463 A1* | 6/2013 | Ghosh | G06F 21/56 726/22 |
| 2013/0152200 A1* | 6/2013 | Alme | H04L 63/145 726/24 |
| 2014/0282872 A1* | 9/2014 | Hansen | H04L 63/102 726/3 |
| 2014/0283041 A1* | 9/2014 | Cao | G06F 21/563 726/22 |
| 2014/0283067 A1* | 9/2014 | Call | H04L 63/1425 726/23 |
| 2014/0283068 A1* | 9/2014 | Call | H04L 63/1425 726/23 |
| 2014/0380482 A1* | 12/2014 | Thomas | G06F 21/566 726/24 |
| 2015/0082440 A1* | 3/2015 | Pickett | H04L 63/145 726/24 |
| 2015/0096023 A1* | 4/2015 | Mesdaq | H04L 63/145 726/23 |
| 2015/0096024 A1* | 4/2015 | Haq | H04L 63/145 726/23 |
| 2015/0096025 A1* | 4/2015 | Ismael | G06F 21/566 726/23 |
| 2015/0295942 A1* | 10/2015 | Tao | H04L 63/1483 726/23 |
| 2015/0341385 A1* | 11/2015 | Sivan | H04L 63/1466 726/23 |
| 2016/0028742 A1* | 1/2016 | Johns | G06F 16/986 726/26 |
| 2016/0028743 A1* | 1/2016 | Johns | H04L 63/123 726/26 |
| 2016/0080345 A1* | 3/2016 | Safruti | H04L 67/02 726/6 |
| 2016/0088015 A1* | 3/2016 | Sivan | G06F 16/986 726/23 |
| 2016/0105449 A1* | 4/2016 | Montagnon | H04L 67/2814 726/22 |
| 2016/0134588 A1* | 5/2016 | Falkowitz | H04L 63/02 726/11 |
| 2016/0142419 A1* | 5/2016 | Antipa | H04L 63/105 726/1 |
| 2016/0142428 A1* | 5/2016 | Pastore | H04L 63/1466 726/23 |
| 2016/0142438 A1* | 5/2016 | Pastore | G06F 21/554 713/171 |
| 2016/0154771 A1* | 6/2016 | Tang | G06F 3/0481 715/234 |
| 2016/0314298 A1* | 10/2016 | Martini | G06F 21/53 |
| 2017/0099319 A1* | 4/2017 | Hunt | H04L 63/1483 |
| 2017/0180378 A1* | 6/2017 | Tyler | H04L 63/1433 |
| 2017/0195310 A1* | 7/2017 | Tyler | H04L 63/083 |
| 2017/0200004 A1* | 7/2017 | Ghosh | G06F 21/56 |
| 2017/0201540 A1* | 7/2017 | Call | H04L 63/1425 |
| 2017/0286544 A1* | 10/2017 | Hunt | H04L 63/1416 |
| 2017/0324772 A1* | 11/2017 | Pastore | H04L 63/1466 |
| 2017/0357804 A1* | 12/2017 | Beskrovny | G06F 16/10 |
| 2018/0012256 A1* | 1/2018 | Napchi | G06Q 30/0277 |
| 2018/0032441 A1* | 2/2018 | De | G06F 12/1009 |
| 2018/0032721 A1* | 2/2018 | De | G06F 12/1009 |
| 2018/0032731 A1* | 2/2018 | De | G06F 12/1009 |
| 2018/0041527 A1* | 2/2018 | Call | H04L 63/1425 |
| 2018/0052992 A1* | 2/2018 | Palanichamy | G06F 21/53 |
| 2018/0107821 A1* | 4/2018 | Eshkenazi | G06F 21/51 |

* cited by examiner

ACTIVATING MALICIOUS ACTIONS WITHIN ELECTRONIC DOCUMENTS

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Due to the pervasion of computer systems in everyday life, there is an increase in hostile or intrusive malicious software ("malware"), which may be used to gain unauthorized access to users' data or otherwise create harmful situations on the computing device. It may be difficult to determine which software applications contain malware and which do not. Additionally, in some cases an electronic document may be sent to a user which contains embedded instructions and/or inducement messages intended to encourage the user to active hidden malware embedded within the document. Because the malware may require activation, in such cases, a malware author may be able to evade behavioral analysis systems from detecting the malware using traditional methods.

SUMMARY

According to at least one embodiment, a method for activating a malicious action with an electronic document is described. In one embodiment, the method may include receiving, by a processor of a computing device, the electronic document; identifying, by the processor, an object embedded within the electronic document; identifying, by the processor, an action associated with execution of the object; executing, by the processor, the action within a context of rules associated with the object; identifying, by the processor, at least one behavior that results from execution of the action; and determining, by the processor, an existence of at least one malicious element from the identified behavior. In some cases, the identifying may include analyzing a rendering of a structure of the electronic document; and identifying computer-readable instructions in the structure of the electronic document that is associated with text embedded in the electronic document, an image embedded in the electronic document, an object embedded in the electronic document, a shape embedded in the electronic document, an event embedded in the electronic document, or any combination thereof.

In some cases, the action may be, but is not limited to, opening the electronic document; closing the electronic document; a scrolling action associated with the electronic document; selecting an object within the electronic document, activating or executing code associated with the embedded object, terminating code executing within the electronic document, isolating code associated with the embedded object, analyzing the isolated code, inserting text into the electronic document; and electronically drawing within the electronic document. The electronic document may be, but is not limited to, a word processing document, an electronic spreadsheet document, a Portable Document Format (PDF) document, and an electronic office application.

In some cases, the action may be executed using an application plug-in associated with the electronic document, invoking computer-readable instructions injected into the application, and/or executing the action using an application programming interface (API) associated with the application, wherein the application hosts the electronic document. Invoking the computer-readable instructions may further comprise triggering the application behavior associated with the application.

In some embodiments, the method may include applying a weighted value to the identified behavior based at least in part on a pre-determined set of malicious elements, and identifying a level of malicious activity associated with the electronic document based at least in part on the weighted value. In some embodiments, the method may include analyzing a document object model (DOM) associated with the electronic document prior to identifying the object embedded within the electronic document.

In some embodiments, the method includes performing a security action based at least in part on determining the existence of the at least one malicious element, the security action preventing the malicious element from harming the computing device. The security action may be, but is not limited to, preventing the object from performing an unauthorized action, alerting an administrator as to the existence of the at least one malicious element, quarantining the object, deleting the object, warning a user about the object, or any combination thereof.

A computing device configured for activating a malicious action with an electronic document is also described. The computing device may include a processor and memory in electronic communication with the processor. The memory may store computer executable instructions that, when executed by the processor, cause the processor to perform the steps of receiving the electronic document; identifying an object embedded within the electronic document; identifying an action associated with execution of the object; executing the action within a context of rules associated with the object; identifying at least one behavior that results from execution of the action; and determining an existence of at least one malicious element from the identified behavior. In some cases, the identifying may include analyzing a rendering of a structure of the electronic document; and identifying computer-readable instructions in the structure of the electronic document that is associated with text embedded in the electronic document, an image embedded in the electronic document, an object embedded in the electronic document, a shape embedded in the electronic document, an event embedded in the electronic document, or any combination thereof.

In some embodiments, the processor may further apply a weighted value to the identified behavior based at least in part on a pre-determined set of malicious elements, and identify a level of malicious activity associated with the electronic document based at least in part on the weighted value. In some embodiments, the processor may analyze a document object model (DOM) associated with the electronic document prior to identifying the object embedded within the electronic document.

In some embodiments, the processor may perform a security action based at least in part on determining the existence of the at least one malicious element, the security action preventing the malicious element from harming the computing device. The security action may be, but is not limited to, preventing the object from performing an unauthorized action, alerting an administrator as to the existence of the at least one malicious element, quarantining the object, deleting the object, warning a user about the object, or any combination thereof.

A non-transitory computer-readable storage medium storing computer executable instructions is also described. When the instructions are executed by a processor, the execution of the instructions may cause the processor to perform the steps of receiving the electronic document; identifying an object embedded within the electronic document; identifying an action associated with execution of the object; executing the action within a context of rules associated with the object; identifying at least one behavior that results from execution of the action; and determining an existence of at least one malicious element from the identified behavior. In some cases, the identifying may include analyzing a rendering of a structure of the electronic document; and identifying computer-readable instructions in the structure of the electronic document that is associated with text embedded in the electronic document, an image embedded in the electronic document, an object embedded in the electronic document, a shape embedded in the electronic document, an event embedded in the electronic document, or any combination thereof.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
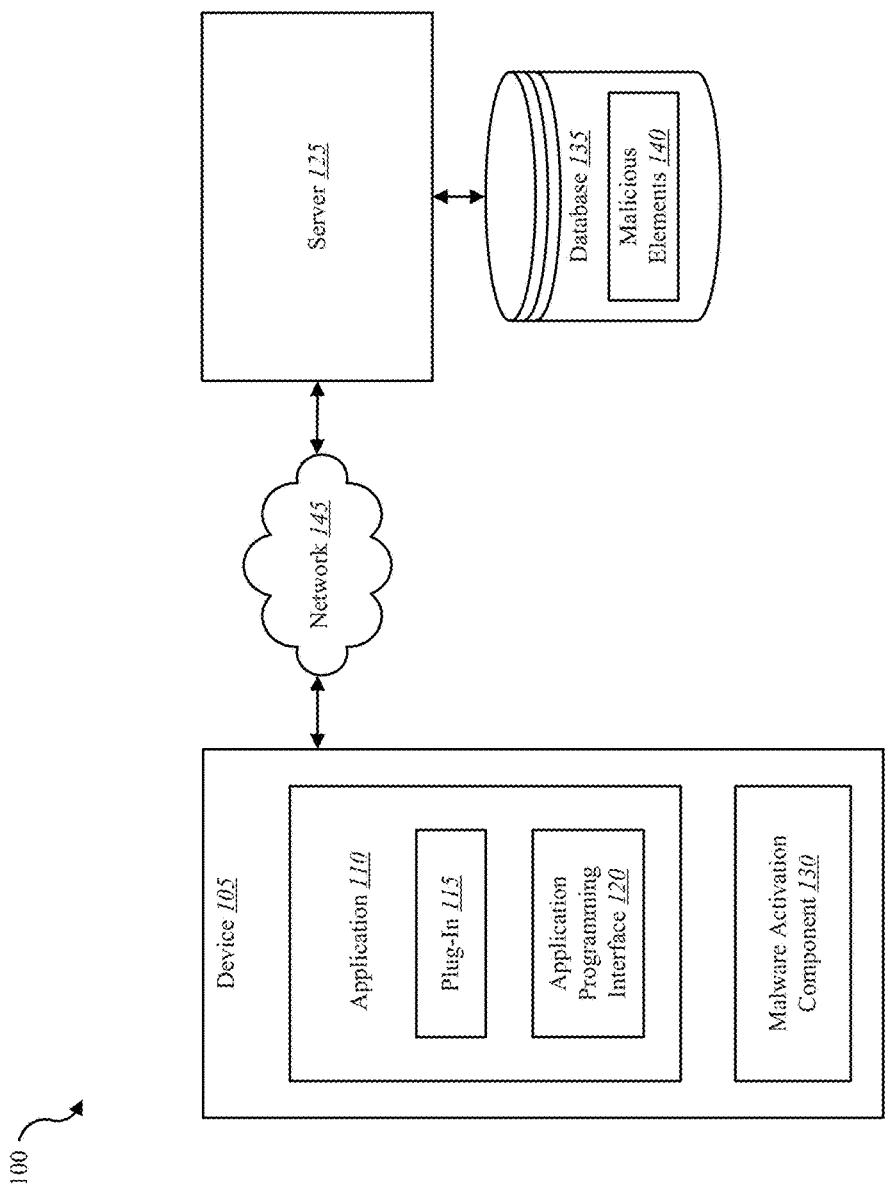
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to activating a malicious action embedded within an electronic document, where the malicious action may be consider malicious software or "malware." Malware may comprise, for example, computer viruses, worms, spyware, adware, Trojan horses, ransomware, rootkits, adware, scareware, and the like. Malware may enable unauthorized access to personal information by, for example, logging keystrokes or monitoring the activity on the computing device. Malware may also hijack a user's data and only release the data to the user upon payment of a fee. As malware detection techniques evolve, so do malware evasion techniques. For example, existing malware detection systems may only be able to detect malware elements that exhibit known behaviors; however, malware authors may embed hidden malware code in documents that can only be discovered when the embedded code is executed. Thus, until execution, the malware may not be detected by traditional malware detection systems Systems and methods are described in which malicious events and/or actions embedded in electronic documents may be executed in order to identify malicious behaviors which may harm a computing system. The systems and methods may be performed on a client's computing device itself without any noticeable impact on system performance and/or user experience. In addition, the systems and methods may be leveraged in dynamic malware analysis platforms and may be utilized at endpoint solutions as well.

Malicious documents may be sent to targeted users, where the documents have embedded instructions and inducement messages intended to get the user to activate the malware embedded within the document. Due to the need to activate the malware, the malware author may be able to evade behavioral analysis systems from detecting the malicious behavior that the malware will exhibit once the user activates the content.

Human presence simulators currently exist that attempt to click buttons and interact with user interfaces to enable full execution of a sample of embedded malware, but the human presence simulators do not work well with documents having interface elements rendered by software when displaying content to users that are not user interface primitives.

In one example, an electronic mail (e-mail) message may be sent to a user which contains a document with an embedded Jscript object having associated instructions which indicate the user should "click to load data." In this example, an existing e-mail scanning service which employs emulation and multiple static analysis engine may miss the embedded Jscript object. The existing e-mail scanning service may open the document in a hosting application and may miss the embedded object. In some further embodiments, analysis of the embedded object may reveal objects not activated by other publicly available sandboxes.

The systems and methods described herein may, in one embodiment, use an application plug-in and/or application programming interface (API) and/or an application hook in an application (e.g., Microsoft® Word, Microsoft® Excel, etc.) that opens and presents an electronic document to the use. As the document is being presented, the content may be reviewed to understand and activate elements of the document that are required for embedded and/or hidden malware to exhibit its behavior. For example, the systems and methods may scroll through the document to activate obscure objects or may perform programmatic activation to execute embedded code.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include device 105, where a software application 110 has been downloaded onto device 105, and where application 110 is associated with an electronic document. For example, the application may be a Microsoft® Office® product such as Microsoft® Word®. The electronic document may be, for example, a word processing text and image document that runs in Word®, such as a .doc, .dot, .docx, .docm, etc., document. Although Microsoft® Word® is used as an example, any application and electronic document combination may be contemplated. Other examples of the electronic document may include graphical documents, spreadsheets, electronic presentation documents, engineering drafting documents, flowcharts, and the like.

Examples of the device 105 may include any of a mobile device, smart phone, personal computing device, computer, laptop, desktop, server, media content set top box, satellite set top box, cable set top box, DVR, personal video recorders (PVR), etc.

The application 110 may be associated with a plug-in 115 and/or an application programming interface (API) 120, where the plug-in 115 and/or the API 120 may enable the steps described herein with regard to activating malware elements. In another embodiment, an application hook may be used in addition to or in place of the plug-in 115 and/or the API 120. In some embodiments, the plug-in 115 and/or API 120 and/or hook may have an understanding of the structure of documents running within the application, as well as have an understanding of the rules associated with the application and the electronic document. The plug-in 115 and/or API may thus be enabled to instruct the processor to take a number of actions, including identifying document elements, objects, associated actions, and instructing the processor to execute identified actions in order to uncover malware elements and malicious behavior.

Server 125 may include any combination of a data server, a cloud server, a server associated with an automation service provider, proxy server, mail server, web server, application server, database server, communications server, file server, home server, mobile server, name server, etc. In some embodiments, the server may include database 135. Although depicted as being connected to or a part of server 125, in some cases, database 135 may be connected to or a part of device 105. In some embodiments, both server 125 and device 105 may include a database containing a list of known malware associated with malicious activities, elements, objects and/or events. such as database 135. In some configurations, the database 135 may keep a list of known malicious activities, elements, objects and/or events, etc. The list of known malicious activities may be dynamic and may update over time.

Network 145 may enable the device 105 to communicate with other devices, as well as enables device 105 to communicate with server 125. In some cases, network 145 may be one of a plurality of wired and/or wireless networks, for example networks where nodes communicate with one another as in a mesh network.

As illustrated, the device 105 may include a malware activation component 130. In some embodiments, malware activation component 130 may identify and activate objects hidden and/or embedded within documents, where activation or execution of the objects may result in malicious behavior. Further details regarding the malware activation component 130 are discussed in more detail below.

Figure 2:
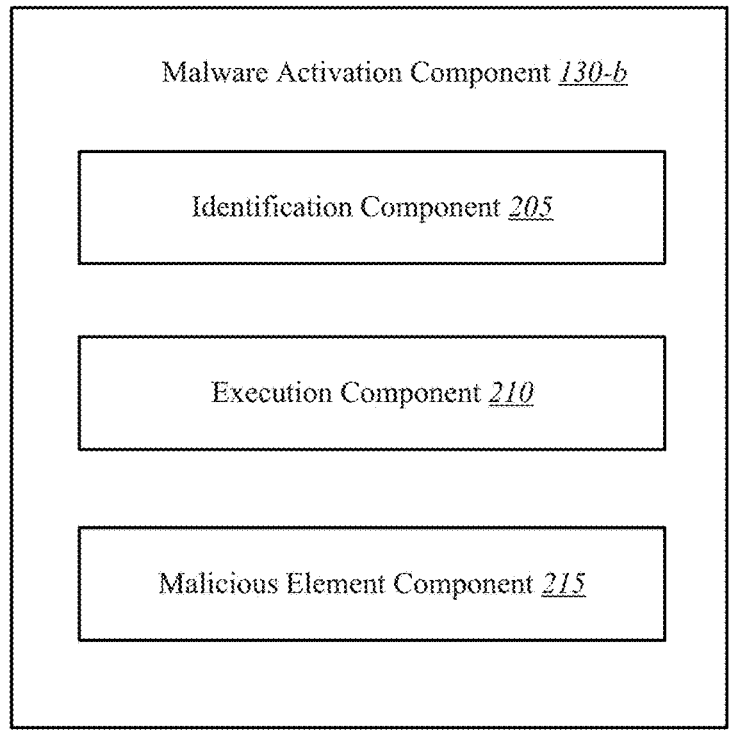
FIG. 2 is a block diagram illustrating one embodiment of a malware activation component.

FIG. 2 is a block diagram illustrating one example of a malware activation component 130-a. Malware activation component 130-a may be one example of malware activation component 130 depicted in FIG. 1. As depicted, malware activation component 130-a may include identification component 205, execution component 210, and malicious element component 215. Other components may be contemplated.

In one embodiment, a user may obtain or receive an electronic document on a computing device, such as device 105. The electronic document may be received by the device, for example, in an electronic mail (e-mail) message, may be downloaded from the Internet, an intranet, or from any other source. In some cases, the electronic document may be a document typically associated with office software applications, such as a word processing document, a spreadsheet, a presentation document, a diagramming document, a graphical document, a flow chart diagram, and the like. Other electronic documents may be contemplated and other applications which run the electronic documents may be contemplated.

The electronic document may contain instructions and/or inducement messages intended to cause the user to unknowingly activate hidden malware elements. In such embodiments, the malware may only exhibit its hostile or intrusive behaviors when the code associated with the malware is executed; however, due to the hidden nature of the malware, the malware behaviors may not come into existence until the user performs an action which activates the malicious. In previously known malware detection methods, human presence simulators may be used in an effort to interact with documents by way of simulating clicking links, clicking on icons, scrolling through a document, etc. in order to execute the actions associated with the malware elements; however, the current human simulators do not work when the interactive elements rendered by office software and/or office document applications that display content to users are not, for example, Microsoft® Windows® user interfaces (UIs). More specifically, a human simulator may act within the execution environment, but using a human simulator is limited when considering document-based malware analysis where the electronic document host application owns their own rendering engine. The rendering engine in these cases, for example, cannot be used with optical character recognition (OCR) of screenshots which may be extremely expensive, prone to errors, and may not provide sufficient information necessary for high precision detection rules.

Because the electronic document is likely, in and of itself, a passive document, the malware may not be detected by traditional malware detection techniques. Thus, a plug-in or API may be associated with the application running the electronic document in order to activate the malware behaviors.

In one embodiment, identification component 205 may identify (e.g., by way of the plug-in and/or API or other means) an object embedded within the electronic document when the document is opened within the application. After identifying an object embedded within the electronic document, the identification component 205 may identify an action associated with the execution of the object. Object and action identification is described in more specifically with respect to FIG. 3. In some embodiments, the plug-in 115 and/or the API 120 will analyze every document that is received by the device 105. In other embodiments, the determination as to which electronic documents are analyzed for hidden malware may be determined by user and/or administrator preferences.

In one embodiment, after the object and associated action are identified, execution component 210 may be configured to execute the action within the confines of the rules associated with the electronic document and the object. In addition, the execution component 210 may execute the identified action in order to cause the object to exhibit the associated behavior. The execution component 210 may execute the action by way of invoking software code associated with the application, where the software code may provide instructions for the processor to execute the action.

Execution of the action by the plug-in 115 or API 120 may be as close to execution of the action as it would be if the user activated the behavior through execution.

In one embodiment, malicious element component 215 may be configured to perform a security action based at least in part on determining the existence of a malicious element. For example, upon determination that a malicious element and/or malicious behavior exists, the malicious element component 215 may enable the execution of software associated with a security action to prevent the malicious element from harming device 105. The security action may be, but is not limited to, preventing the object from performing an unauthorized action, alerting an administrator as to the existence of malicious element, quarantining the object, deleting the object, warning a user about the potential malicious behavior associated with the object, or any combination of thereof. In some embodiments, the security action may be a security action associated with currently known malware detection and prevention techniques. Thus, the plug-in and API (and/or other systems which enable the steps herein), may work in conjunction with currently known malware detection techniques in order to provide a more robust system for combating malware. For example, the action may be "on-close," "on-exit" or "on-destroy" events associated with document closure, application exit, or document deletion, respectively, where executing the actions may active regions of malware code allowing for behavioral analysis to pick up hidden behaviors to detect the malware. Object recycling, document closure, application exit, or any combination thereof may be performed to activate those regions of malware code allowing for behavioral analysis to pick up obfuscated behaviors and detect the malware.

In some embodiments, the malicious element component 215 may interface with a database 135 containing an aggregation of known malicious elements, and in some cases, associated malicious behaviors. Based at least in part on identifying the object, the action, and/or the behavior of the malicious element, the system may assign a weight value to the behavior based at least in part on comparing the behavior with the known malicious elements and behaviors stored in database 135. Based on the weight of the malicious behavior, and thus of the malware, the system may take any number of different actions, including warning a user or an administrator or taking steps to prevent harmful effects of the malware. For example, a greater weight may be given to malware associated with unauthorized access to a user's private files (e.g., keylogging, access to passwords) or to malware which initiates a virus, where as a lesser weight may be given to malware whose behavior results only in an inconvenience, such as adware. In some embodiments, the weights may be determined by an administrator associated with the plug-in 115 and/or API 120. In other embodiments, the weights may be user-defined.

Figure 3:
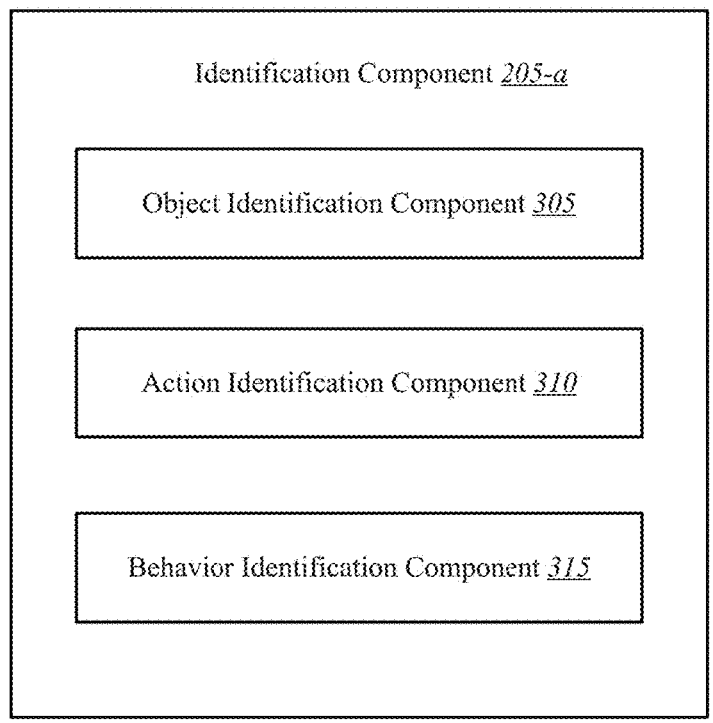
FIG. 3 is a block diagram illustrating one embodiment of a malware activation component.

FIG. 3 is a block diagram illustration one example of identification component 205-a. Identification component 205-a may be an example of identification component 205 depicted in FIG. 2. Identification component 205-a may comprise object identification component 305, action identification component 310, and behavior identification component 315.

In some embodiments, object identification component 305 may be configured to identify an object embedded within the electronic document. Furthermore, identifying the object may further include analyzing a rendering of a structure of the electronic document, and identifying computer-readable instructions (e.g., software code) within the structure of the electronic document. The software code may be associated with, but is not limited to, text embedded in the electronic document, or may be associated with an embedded image, a shape and/or an icon embedded in the document, code related to an action associated with the document, or any combination thereof. Object identification component 305 may identify an object packager or packager object associated with an actionable element.

Object identification component 305 may analyze the structure of the electronic document using a document object model (DOM). The DOM may be a cross-platform language-independent API which treats an electronic documents as a tree structure where each node is an object which represents a part of the electronic document. The plug-in 115 may thus traverse the tree structure associated with the electronic document, and taking into consideration the rules associated with the application running the electronic document, identify objects that appear to exist outside of the context of the application and electronic document. Objects that exist outside of the context of the application and electronic document may indicate the possibility of malware. Identified objects may be manipulated programmatically (i.e., executed) in order to determine whether any determinable changes occur or behavior exhibit as a result of the execution. Although a DOM method may be contemplated, other object identification techniques may be used.

In some embodiments, behavior identification component 315 may be configured to identify at least one behavior that results from execution of the action. In addition, behavior identification component 315 may determine the existence of at least one malicious element associated with the identified behavior. Identified behaviors may be, for example, behavior associated with Internet worms, viruses, Trojan horses, spyware, ransomware, unauthorized remote access, and the like For example, the malicious element component 215 may determine the presence of code in the document that is not typically associated with the application or the type of document. More specifically, the code may indicate an action or behavior that is not usually associated with the types of behaviors and interactions a user might utilize in context of interacting with the office document.

In some embodiments, action identification component 310 may be configured to identify an action related to interaction with the electronic document such as, but not limited to, opening the electronic document, closing the electronic document, scrolling within the electronic document, selecting an object within the electronic document, activating or executing code associated with the embedded object, terminating code executing within the electronic document, isolating code associated with the embedded object, analyzing the isolated code, inserting text and/or shape objects within the electronic document, electronically drawing within the electronic document, or any combination thereof.

In one example embodiment, a Microsoft® Word® document may be sent to a user's computing device in an e-mail. Upon opening the electronic document, the user may be presented with text that reads "double-click" and is associated with an interactive icon embedded in the document. Regardless if the user, double-clicks or not, the plug-in, the API, or another activator may analyze the rendered document structure and determine the interactive icon is an object which may be associated with malware. The plug-in 115, for example, may also look for text, images, other objects, shapes. Once the hidden and/or embedding object is identified, then the system may be then determine whether there is an action associated with the object, and whether the action may be activated by the system. The action in this example may be double-clicking on the icon, where double-clicking results in the execution of malicious behavior. For example, once the user double-clicks, the malware may upload a virus to the user's computer. In order to avoid the malicious behavior, the plug-in activates code to "double-click" on the icon, with the knowledge that a malicious behavior is likely associated with the object and action. With that knowledge, the plug-in 115 can preempt the malware with a security action.

In another example, the e-mail itself may contain an embedded Jscript object instruction the user to "click to load data." The e-mail may be scanned by an security e-mail scanning service which may employ emulation and multiple static analysis engines to determine the presence of malware. However, in some cases, the embedded object may be missed by traditional security malware scanning due to the embedded nature. In addition, other security methods such as sandbox testing, may fail to activate the embedded code.

Based on the current example, the associated action for the Jscript object may be "activate shape X" and/or "click on ActiveX comment button" and/or "click on URL link to open webpage in a browser." The plug-in 115 may then perform or execute these actions using rules associated with interactions related to the application (e.g., click on a URL in a word document or an email to open the URL in a connected browser).

Figure 4:
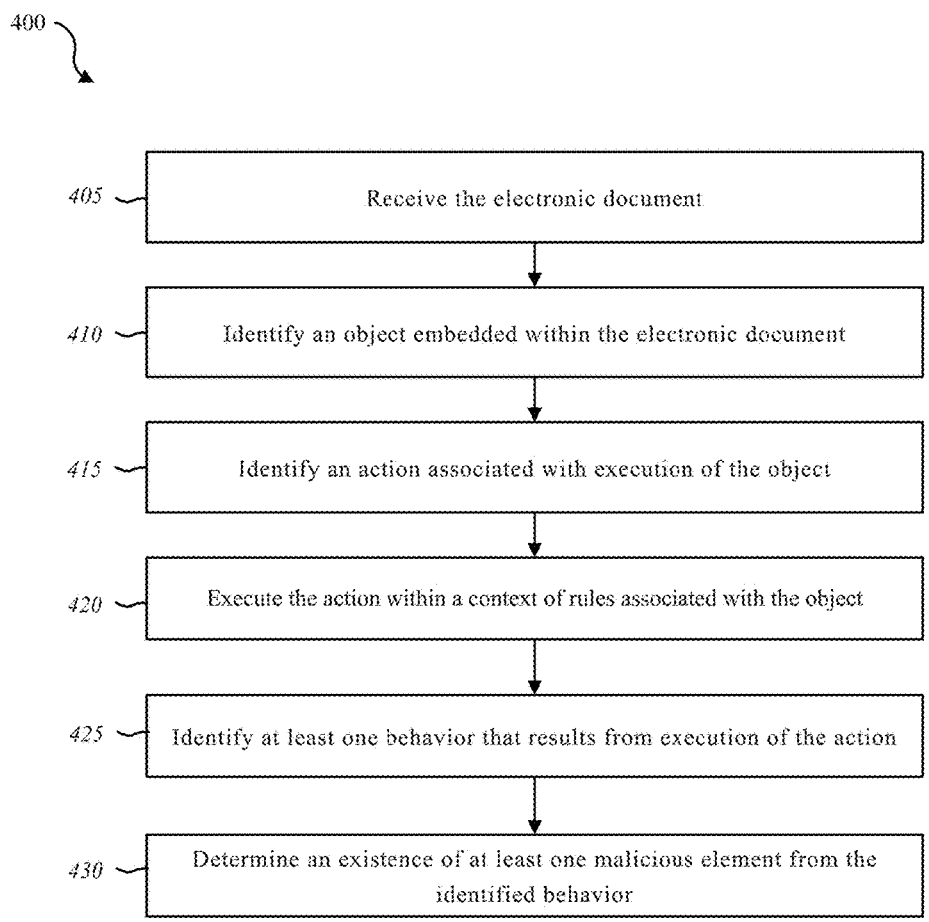
FIG. 4 is a flow diagram illustrating one embodiment of a method for runtime malware detection.

FIG. 4 is a flow diagram illustrating one embodiment of a method 400 for activating malicious actions within electronic documents. In some configurations, the method 400 may be implemented by the malware activation component 130 and 130-b illustrated in FIGS. 1 and/or 2. In some configurations, the method 400 may be implemented in conjunction with the application 110 illustrated in FIG. 1.

At block 405, the method 400 may include receiving, by a processor of a computing device, an electronic document. At block 410, the method 400 may include identifying, by the processor, an object embedded within the electronic document. At block 415, the method 400 may include identifying, by the processor, an action associated with execution of the object. At block 420, the method 400 may include executing, by the processor, the action within a context of rules associated with the object. At block 425, the method 400 may include identifying, by the processor, at least one behavior that results from execution of the object. At block 430, the method 400 may include determining an existence of at least one malicious element from the identified behavior.

Figure 5:
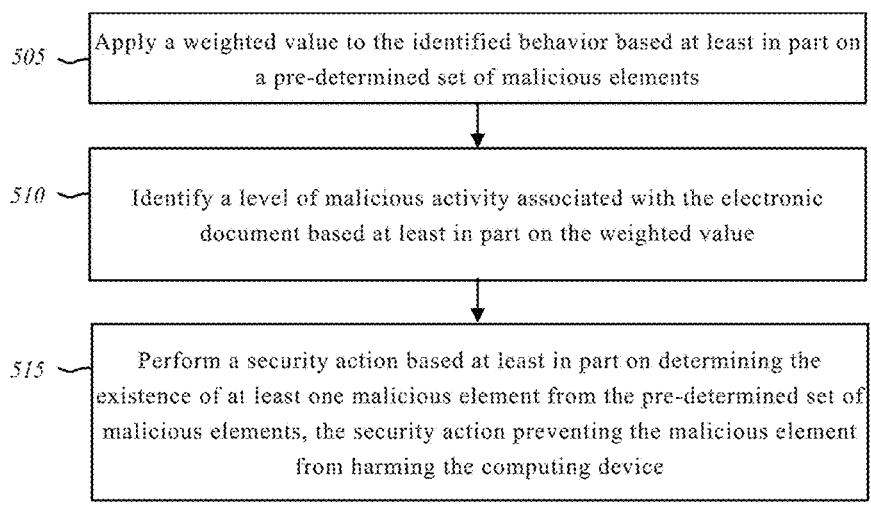
FIG. 5 is a flow diagram illustrating one embodiment of a method for runtime malware detection.

FIG. 5 is a flow diagram illustrating one embodiment of a method 500 for activating malicious actions within electronic documents. In some configurations, the method 500 may be implemented by the malware activation component 130 and/or 130-b illustrated in FIG. 1 or 2. In some configurations, the method 500 may be implemented in conjunction with the application 110 and/or by plug-in 115 and or API 120 illustrated in FIG. 1.

At block 505, the method 500 may include applying, by the processor, a weighted value to an identified behavior based at least in part on a pre-determined set of malicious elements. The identified behavior may be, in some embodiments, the behavior identified at block 425 of FIG. 4. In some embodiments, the pre-determined set of malicious elements may be a list or other aggregation of malicious elements stored in database 135 of FIG. 1. At block 510, the method 500 may include, identifying a level of malicious activity associated with the electronic document based at least in part on the weighted value. At block 515, the method 500 may include performing, by the processor, a security action based at least in part on determining the existence of at least one malicious element from the pre-determined set of malicious elements, the security action preventing the malicious element from harming the computing device.

Figure 6:
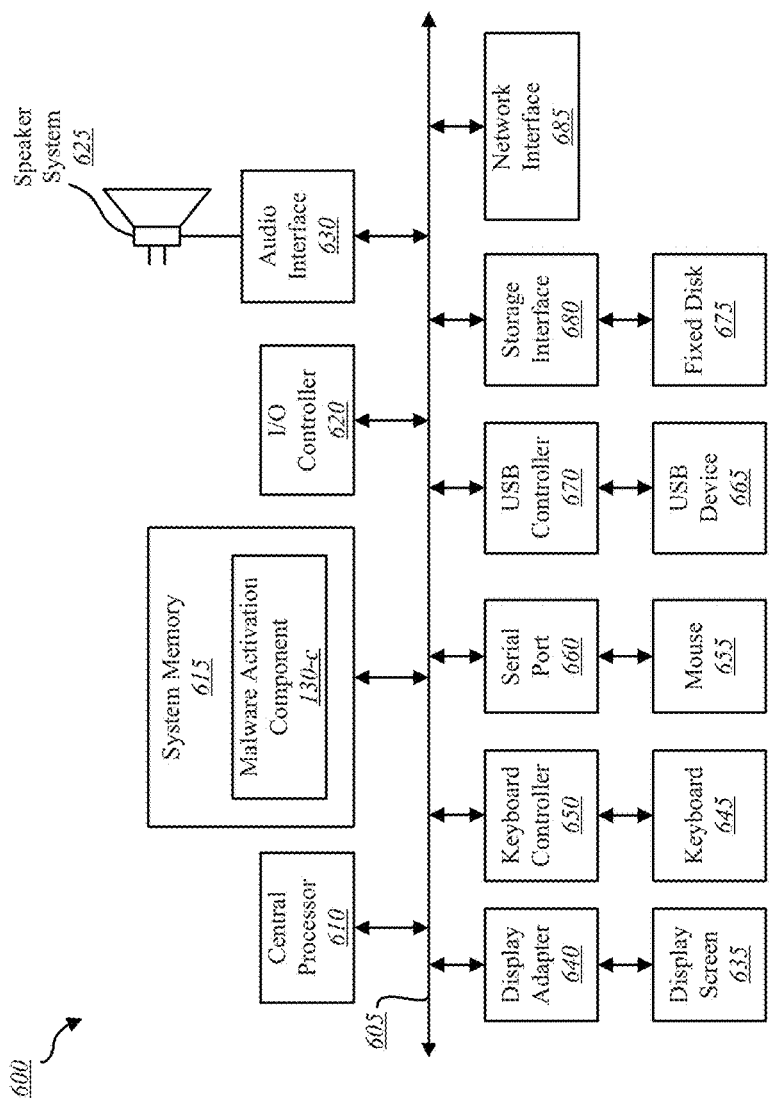
FIG. 6 depicts a block diagram of a computer system suitable for implementing the present systems and methods.

FIG. 6 depicts a block diagram of a computing device 600 suitable for implementing the present systems and methods. The device 600 may be an example of device 105 and/or server 125 illustrated in FIG. 1. In one configuration, device 600 includes a bus 605 which interconnects major subsystems of device 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 860 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the malware activation component 130-c to implement the present systems and methods may be stored within the system memory 615. The malware activation component 130-b may be one example of the malware activation component 130 depicted in FIG. 1. Applications (e.g., application 110) resident with device 105 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of device 600, can connect to a standard computer readable medium for storage and/or retrieval of information, such as a fixed disk drive 675. Fixed disk drive 675 may be a part of device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for activating a malicious action within an electronic document, the method comprising:
   receiving, by a processor of a computing device, the electronic document;
   analyzing a tree structure of the electronic document;
   identifying, by the processor, an object embedded within the electronic document based at least in part on the analyzing;
   performing, by the processor, an action associated with execution of the object, the action including at least one of closing the electronic document, scrolling a page of the electronic document, deleting the electronic document, inserting text into the electronic document, electronically drawing within the electronic document, recycling one or more objects of the electronic document, exiting an application configured to open the electronic document, or any combination thereof;
   executing, by the processor, the action within a context of rules associated with the object;
   identifying, by the processor, at least one behavior of the object that results from execution of the action;
   determining, by the processor, an existence of at least one malicious element from the identified behavior; and
   in response to determining the existence of the at least one malicious element, performing a security action to protect the computing device against the at least one malicious element.

2. The method of claim 1, wherein identifying the object further comprises:
   analyzing a rendering of a structure of the electronic document; and
   identifying computer-readable instructions in the structure of the electronic document that is associated with text embedded in the electronic document, an image embedded in the electronic document, an object embedded in the electronic document, a shape embedded in the electronic document, an event embedded in the electronic document, or any combination thereof.

3. The method of claim 1, wherein executing the action further comprises:
   executing the action using an application plug-in associated with the electronic document.

4. The method of claim 1, wherein executing the action further comprises:
invoking computer-readable instructions associated with the application.

5. The method of claim 4, wherein invoking the computer-readable instructions further comprises trigging the application behavior associated with the application.

6. The method of claim 1, wherein executing the action further comprises:
executing the action using an application programming interface (API) associated with the application, wherein the application hosts the electronic document.

7. The method of claim 1, further comprising:
applying a weighted value to the identified behavior based at least in part on a pre-determined set of malicious elements; and
identifying a level of malicious activity associated with the electronic document based at least in part on the weighted value.

8. The method of claim 1, further comprising:
analyzing a document object model (DOM) associated with the electronic document prior to identifying the object embedded within the electronic document.

9. The method of claim 1, wherein the electronic document is at least one selected from the group comprising: a word processing document, an electronic spreadsheet document, a Portable Document Format (PDF) document, and an electronic office application or any combination thereof.

10. The method of claim 1, wherein the action is at least one selected from the group comprising: opening the electronic document; selecting an object embedded within the electronic document; activating or executing code associated with the embedded object; terminating code executing within the electronic document; isolating code associated with the embedded object; analyzing the isolated code; or any combination thereof.

11. The method of claim 1, further comprising:
performing a security action based at least in part on determining the existence of the at least one malicious element, the security action preventing the malicious element from harming the computing device.

12. The method of claim 11, wherein the security action is at least one selected from the group comprising: preventing the object from performing an unauthorized action, alerting an administrator as to the existence of the at least one malicious element, quarantining the object, deleting the object, warning a user about the object, or any combination thereof.

13. A computing device configured to activate a malicious action within an electronic document, the computing device comprising:
a processor;
memory in electronic communication with the processor;
instructions stored in the memory, the instructions being executable by the processor to:
receive the electronic document;
analyze a tree structure of the electronic document;
identify an object embedded within the electronic document based at least in part on the analyzing;
perform an action associated with execution of the object, the action including at least one of closing the electronic document, scrolling a page of the electronic document, deleting the electronic document, inserting text into the electronic document, electronically drawing within the electronic document, recycling one or more objects of the electronic document, exiting an application configured to open the electronic document, or any combination thereof;
execute the action within a context of rules associated with the object;
identify at least one behavior of the object that results from execution of the action;
determine an existence of at least one malicious element from the identified behavior; and
in response to determining the existence of the at least one malicious element, perform a security action to protect the computing device against the at least one malicious element.

14. The computing device of claim 13, wherein identifying the object further comprises:
analyzing a rendering of a structure of the electronic document; and
identifying computer-readable code in the structure of the electronic document that is associated with text embedded in the electronic document, an image embedded in the electronic document, an object embedded in the electronic document, a shape embedded in the electronic document, an event embedded in the electronic document, or any combination thereof.

15. The computing device of claim 13, wherein executing the action further comprises invoking computer-readable instructions injected into the application.

16. The computing device of claim 13, wherein the instructions are further executable by the processor to:
apply a weighted value to the identified behavior based at least in part on a pre-determined set of malicious elements; and
identify a level of malicious activity associated with the electronic document based at least in art on the weighted value.

17. The computing device of claim 13, wherein the instructions are further executable by the processor to:
analyze a document object model (DOM) associated with the electronic document prior to identifying the object embedded within the electronic document.

18. A non-transitory computer-readable medium storing instructions thereon, the instructions being executable by a processor to:
receive the electronic document;
analyze a tree structure of the electronic document;
identify an object embedded within the electronic document based at least in part on the analyzing;
perform an action associated with execution of the object, the action including at least one of closing the electronic document, scrolling a page of the electronic document, deleting the electronic document, inserting text into the electronic document, electronically drawing within the electronic document, recycling one or more objects of the electronic document, exiting an application configured to open the electronic document, or any combination thereof;
execute the action within a context of rules associated with the object;
identify at least one behavior of the object that results from execution of the action;
determine an existence of at least one malicious element from the identified behavior
in response to determining the existence of the at least one malicious element, perform a security action to protect the computing device against the at least one malicious element.

19. The non-transitory computer-readable medium of claim 18, wherein the instructions are further executable by the processor to:
- apply a weighted value to the identified behavior based at least in part on a pre-determined set of malicious elements; and
- identify a level of malicious activity associated with the electronic document based at least in part on the weighted value.

20. The non-transitory computer-readable medium of claim 18, wherein the instructions are further executable by the processor to:
- analyze a document object model (DOM) associated with the electronic document prior to identifying the object embedded within the electronic document.

* * * * *